Patented Nov. 3, 1942

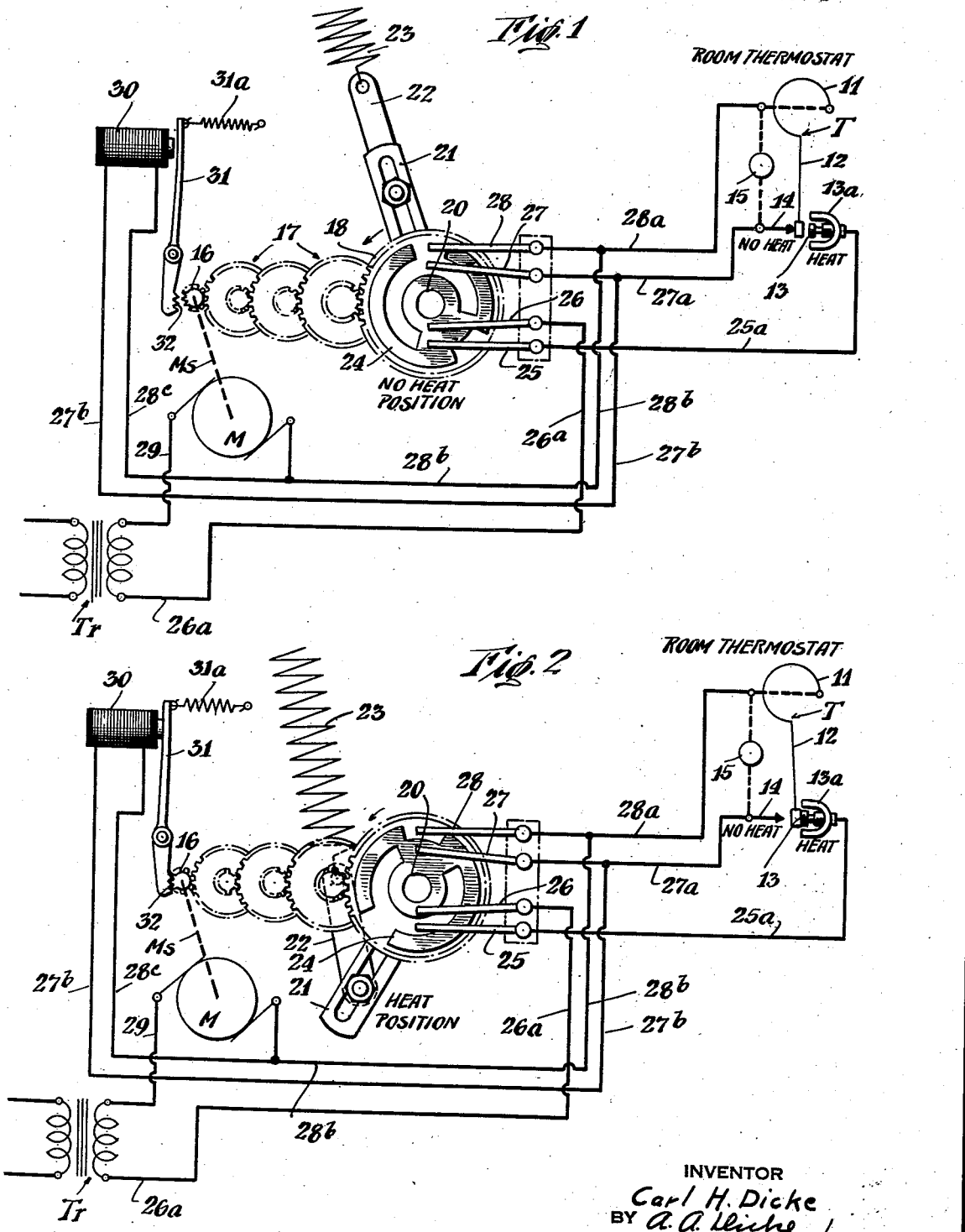

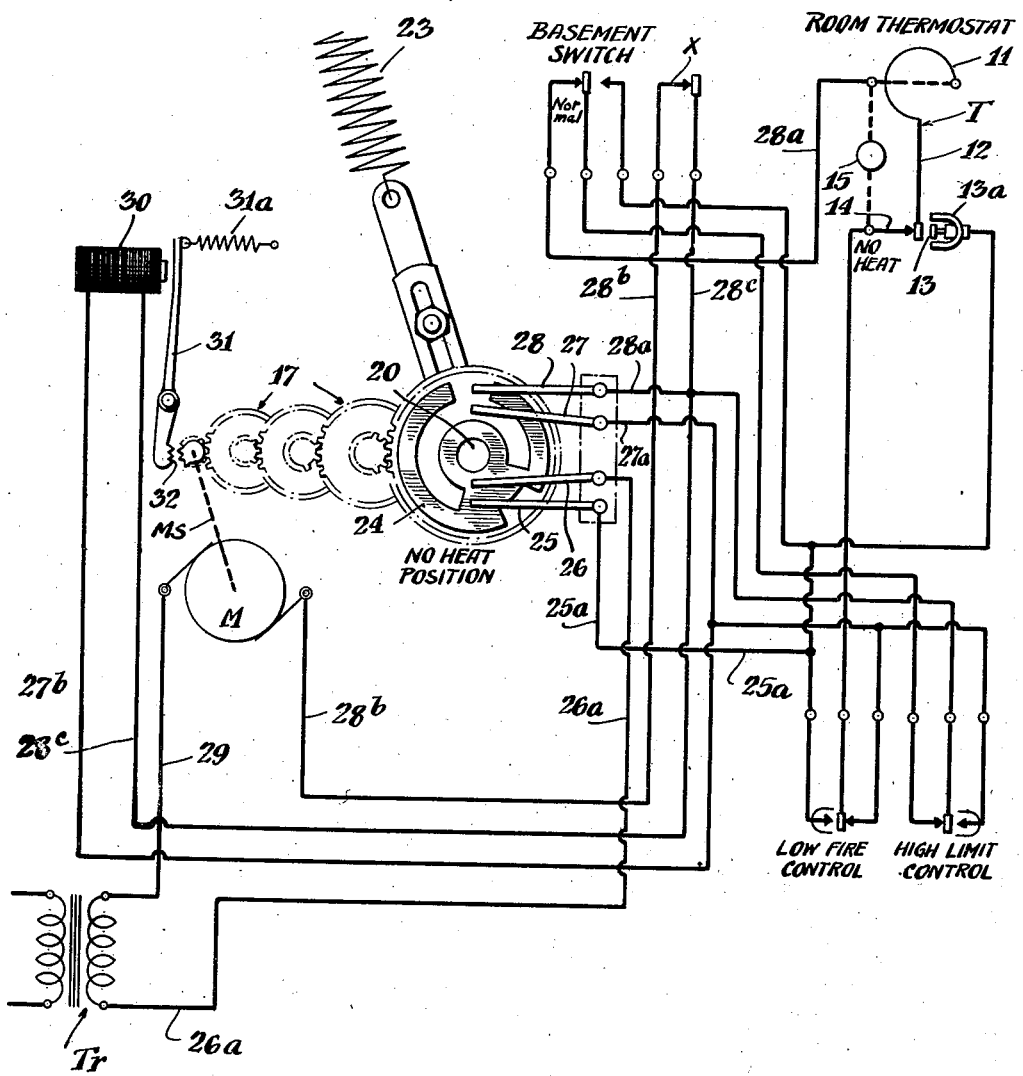

2,300,839

UNITED STATES PATENT OFFICE 2,300,839

TEMPERATURE REGULATING SYSTEM

Carl H. Dicke, Dayton, Ohio, assignor to The Master Electric Company, a corporation of Ohio Application July 10, 1940, Serial No. 344,641

5 Claims. (Cl. 236—74)

This invention relates to an improved temperature regulating system and more particularly to such a device for use in connection with the regulation of dampers for heating furnaces.

An object of the invention is to provide a simple and reliable mechanism which will assure that upon the occurrence of electric power failures the damper or other heat controlling mechanism will be adjusted automatically to reduced heat condition.

A further object is to provide an energy storing device such as a spring which will upon the occurrence of power failures and a consequent de-energization of the electric mechanism cause the damper controlling mechanism to return to normal "no heat" position.

Another object is to provide such a device in which the damper controlling motor will in normal operation move in a forward direction from "heat" to "no heat" position whereas upon the occurrence of power failures the motion from the "no heat" position will occur reversely.

Further objects and advantages of the invention will be apparent from consideration of the specification as illustrated by the accompanying drawings of two illustrative embodiments of the invention, in which drawings:

Fig. 1 represents more or less schematically one form the device may take, the parts being shown in the "no heat" position; and Fig. 2 is a corresponding figure, the parts being shown in the "heat" position; whereas Fig. 3 shows the device in combination with various supplemental controls such as basement switch, low fire control, high limit control, etc., the parts being shown in the "no heat" position.

Referring to the drawings, T represents generally a room thermostat which may consist of bi-metal 11, a contact blade 12, a "heat" contact 13 preferably having associated therewith a permanent magnet 13A to insure snap action making and breaking of the circuit in the well-known manner. 14 indicates the "no heat" contact and 15 may be a heat supplementing indicating lamp for the purpose of indicating when the drafts are open and for supplying additional heat to increase the sensitivity of the thermostat when the drafts are open.

Tr indicates a transformer for supplying low voltage current for the operation of the system and M indicates any electric motor which through motor shaft Ms serves to rotate the pinion 16 which through suitable gearing indicated generally as 17 serves to rotate a gear such as 18 mounted upon for rotation with a shaft 20. Shaft 20 will usually be provided with one or more cranks 21 for operating the means for varying the rate of combustion, such as fuel valves or dampers. One of these cranks, such as the one shown, may have connected thereto, as by link 22, an energy storing device such as the return spring 23 which in Fig. 1 is in the position shown when the damper regulating motor is in the "no heat" position.

Connected for rotation with gear 18 and shaft 20 is a suitable commutator such as the one indicated as 24, upon which play contact brushes such as 25, 26, 27, and 28. These brushes are connected respectively through conductors 25a, 26a, 27a, and 28a with the heat contact 13, the transformer B, the "no heat" contact 14, and the thermo-metal 11, respectively.

30 designates any suitable magnet or solenoid which may act upon to attract an armature such as the one indicated as 31, which is normally biased away from the magnet as by spring 31a and which serves to operate one or more detents 32 capable of cooperating with and holding pinion 16.

The operation of the parts thus far described is as follows:

If, when the parts are in the position shown in Fig. 1, the temperature of the room should drop, the blade 12 will move toward and engage contact 13, thus establishing a circuit from the transformer Tr through conductor 26a, brush 26, commutator 24, brush 25, conductor 25a, contact 13, blade 12, thermometal 11, conductor 28a, conductor 28b, to the motor M, and therefrom through conductor 29 back to the transformer Tr. The purpose of the brush 28, as is well known, is of course to insure complete operation of the motor even though the circuit should be broken at 12, 13 before the operation is completed. It will be seen that the motor will cause the shaft 20 to be rotated until the parts are in the position shown in Fig. 2.

During this operation the movement of crank 21 has caused the drafts to be opened and preferably also the check damper closed, causing the fire in the furnace to be accelerated. If the device is used for controlling oil burners, gas valves, etc., the action would of course be the same. It will be noted, however, that during this operation the spring 23 has been stretched. This spring is so dimensioned and positioned that it is capable of rotating the crank 21 and shaft 20 reversely from the position of Fig. 2 to the position of Fig. 1. This is prevented however by the detent 32 which now engages with the teeth of the pinion 16 because the magnet 30 is energized through current flowing in the following circuit:

From the transformer through conductor 26a, brush 26, commutator 24, brush 27, conductors 27a, 27b, through the magnet, through conductor 28c, the motor M, conductor 29, back to the transformer.

The parts will therefore be held in the position shown in Fig. 2 as long as power is supplied and the room thermostat does not engage the "no heat" contact 14. However, if a power failure should occur, the magnet 30 will be deenergized and spring 31a will rock lever 31, withdrawing the detent 32 from pinion 16.

Thereupon, the pull of the spring 23 will rotate the crank 21 and shaft 20 clockwise until the parts have been restored to the position shown in Fig. 1. The drafts will therefore be closed, the check damper opened, thus preventing overheating.

In order to assure that the spring 23 will be capable of returning the crank 21 to normal position, the commutator 24 is so formed that the draft opening operation instead of the usual 180° will be about 135°.

Assuming that the parts are in the "heat" position and the room temperature rises so that 12 engages 14, the following circuit will be established:

From the transformer Tr through conductor 26a, brush 26, commutator 24, brush 27, conductor 27a, contact 14, blade 12, thermo-metal 11, conductor 28a, conductor 28b, motor M, and conductor 29, back to the transformer.

The motor will therefore cause the shaft 20 to rotate forwardly, i. e., in a counterclockwise direction, as shown in the drawings, through the remaining 225° back to the position shown in Fig. 1.

It will be seen therefore that in the absence of a power failure, the damper regulating motor will always operate under power from the electric motor M, whether the operation be a heat increasing or a heat decreasing one. However, in the case of power failure, which is of course a rare occurrence, the spring 23 will cause the shaft 20 to be rotated in a reverse direction (clockwise in the drawings) to the "no heat" position.

Fig. 3 shows one manner of combining with the circuit just described supplemental switches such as a basement switch, a low fire control, a high limit control switch, and a switch X in the motor and magnet circuit. It will be readily seen, by referring to Fig. 3, that when the switch X is opened, the circuit through the motor M and magnet 30 is broken and that therefore the damper regulating motor is returned to the "no heat" position shown. The basement switch may be any ordinary single pole double throw switch or any other type of basement switch preferably connected into the circuit as shown. If desired, the switch X may be so connected with the basement switch that when the basement switch is moved from the normal position the switch X will be opened.

The various circuits in Fig. 3 are the same as those in Fig. 1 with the exception that in the normal position of the several switches shown, the circuits pass through said switches. The low fire control switch is so arranged in the circuit that when the temperature in the combustion space or the flue drops to a certain point, indicating that the fire is low, the motor M will be energized to operate the shaft 20 forwardly say, 135° to the heat position, thus accelerating the fire. If the high limit control switch is moved to the right, as by the occurrence of excessively high temperature in the furnace combustion space, the flue, or the boiler water, or excessively high pressure in the case of steam boilers, the motor M will be energized to rotate the shaft 20 forwardly say, 225° to the "no heat" position.

It will be noted that all of these operations occur under the driving power of the motor M and that the spring 23 is depended upon only when a power failure occurs, which is the only time when electric power is not available and when a secondary source of energy must be used.

The invention is not intended to be limited to the forms shown, which are to be understood as illustrative only and not as limiting, as various changes in construction and arrangement may be made, all coming within the scope of the claims which follow.

I claim:

1. In a temperature regulating system for a heating plant having means for controlling the rate of heat production, a temperature responsive switch in the space heated by said plant, a source of power, operating means including a shaft and crank operable by said power in a forward direction under control of said switch to operate said controlling means from reduced heat to increased heat condition and also operable forwardly by said power to operate said operating means to move said controlling means from increased heat to reduced heat condition, an energy storing spring, means operable by said power under control of said switch to operate said shaft and crank from reduced heat to increased heat position while storing energy in said spring, an electromagnetically actuated means for holding said operating means in increased heat position against the action of said spring, whereby upon the occurrence of a power failure said holding means will become ineffective and said operating means will be actuated by said spring to operate said shaft and crank from increased heat to reduced heat condition.

2. In a temperature regulating system for a heating plant having means for controlling the rate of heat production, a temperature responsive switch in the space heated by said plant, a source of power, an energy storing spring, means including a shaft and crank operable by said power in a forward direction somewhat less than one-half turn under control of said switch to operate said controlling means from reduced heat to increased heat condition while storing energy in said spring and also operable forwardly by said power the balance of a rotation to operate said controlling means from increased heat to reduced heat condition, an electromagnetically actuated means for holding said operating means in increased heat condition against the action of said spring, whereby upon the occurrence of a power failure said holding means will become ineffective and said operating means will be actuated reversely by said spring to move said controlling means from increased heat to reduced heat condition.

3. In a temperature regulating system for a heating plant having means for controlling the rate of heat production, a temperature responsive switch in the space heated by said plant, a source of power, an energy storing spring, means including an electric motor and a pinion operable by said motor under control of said switch to operate a shaft and crank to cause said controlling means to move from reduced heat to increased heat condition while storing energy in said spring and also operable forwardly by said motor the balance of a rotation to operate said controlling means from increased heat to reduced heat condition, an electromagnetically actuated means for engaging said pinion to hold said operating means in increased heat condition against the action of said spring, whereby upon the occurrence of a power failure said holding means will become ineffective and said motor and operating means will be actuated reversely by said spring to operate said controlling means from increased heat to reduced heat condition.

4. In a temperature regulating system for a heating plant having means for controlling the rate of heat production, a temperature responsive switch in the space heated by said plant, a source of power, means including a shaft and crank operable by said power in a forward direction somewhat less than one-half turn under control of said switch to operate said controlling means from reduced heat to increased heat condition and also operable forwardly by said power the balance of a rotation to operate said controlling means from increased heat to reduced heat condition, means tending to operate said shaft reversely, an electromagnetically actuated means for holding said operating means in increased heat position against the action of said reversing means said electromagnetic means being energized when the shaft reaches the increased heat position, whereby upon the occurrence of a power failure said holding means will become ineffective and said operating means will be actuated reversely to move said controlling means from increased heat to reduced heat condition.

5. In a temperature regulating system for a heating plant having means for controlling the rate of heat production, a temperature responsive switch in the space heated by said plant, a source of power, means including an electric motor and a pinion operated thereby, a shaft and a crank operable by said motor in a forward direction somewhat less than one-half turn under control of said switch to operate said controlling means from reduced heat to increased heat condition and also operable forwardly by said motor the balance of a rotation to operate said controlling means from increased heat to reduced heat condition, means tending to operate said shaft reversely, an electromagnetically actuated means for holding said pinion in increased heat position against the action of said reversing means said electromagnetic means being energized when the shaft reaches the increased heat position, whereby upon the occurrence of a power failure said holding means will become ineffective and said operating means will be actuated reversely to operate said controlling means from increased heat to reduced heat condition.

CARL H. DICKE.